United States Patent [19]
Hanson et al.

[11] Patent Number: 5,265,016
[45] Date of Patent: Nov. 23, 1993

[54] METHOD OF SHEAR WAVE VELOCITY ESTIMATION

[75] Inventors: Kenneth E. Hanson; Thompson J. Taylor; Leon A. Thomsen, all of Tulsa, Okla.

[73] Assignee: Amoco Corporation, Chicago, Ill.

[21] Appl. No.: 992,849

[22] Filed: Dec. 16, 1992

Related U.S. Application Data

[63] Continuation of Ser. No. 382,827, Jul. 19, 1989, abandoned.

[51] Int. Cl.$^5$ ............................................. G01V 1/00
[52] U.S. Cl. ...................................... 364/422; 367/75
[58] Field of Search .................. 364/422, 421; 367/75

[56] References Cited

U.S. PATENT DOCUMENTS

| | | | |
|---|---|---|---|
| 4,858,200 | 8/1989 | Goins | 364/421 |
| 4,858,201 | 8/1989 | Goins et al. | 364/421 |
| 4,881,209 | 11/1989 | Bloomquist et al. | 364/421 |

Primary Examiner—Roy N. Envall, Jr.
Assistant Examiner—X. Chung
Attorney, Agent, or Firm—James A. Gabala; Richard A. Kretchmer; Frank J. Sroka

[57] ABSTRACT

A method is disclosed for obtaining an estimate of the shear velocity in a formation material. Utilizing compressional velocity ($V_p$) and density ($\rho$) of the formation material, formation aggregate mineral parameters and formation pore fluid parameters together with a relationship that the frame bulk modulus/frame shear modulus is approximately equal to the bulk modulus of the aggregate mineral grains/shear modulus of the aggregate mineral grains, to obtain an estimate of the shear wave velocity ($V_s$) of the formation material. The present invention is primarily designed for use in the areas where shear wave velocity ($V_s$) measurements are unobtainable due to unconsolidated formations, and specifically, wherein the acoustic velocity of formation fluids and/or wellbore fluids is greater than the desired shear wave velocity.

13 Claims, 10 Drawing Sheets

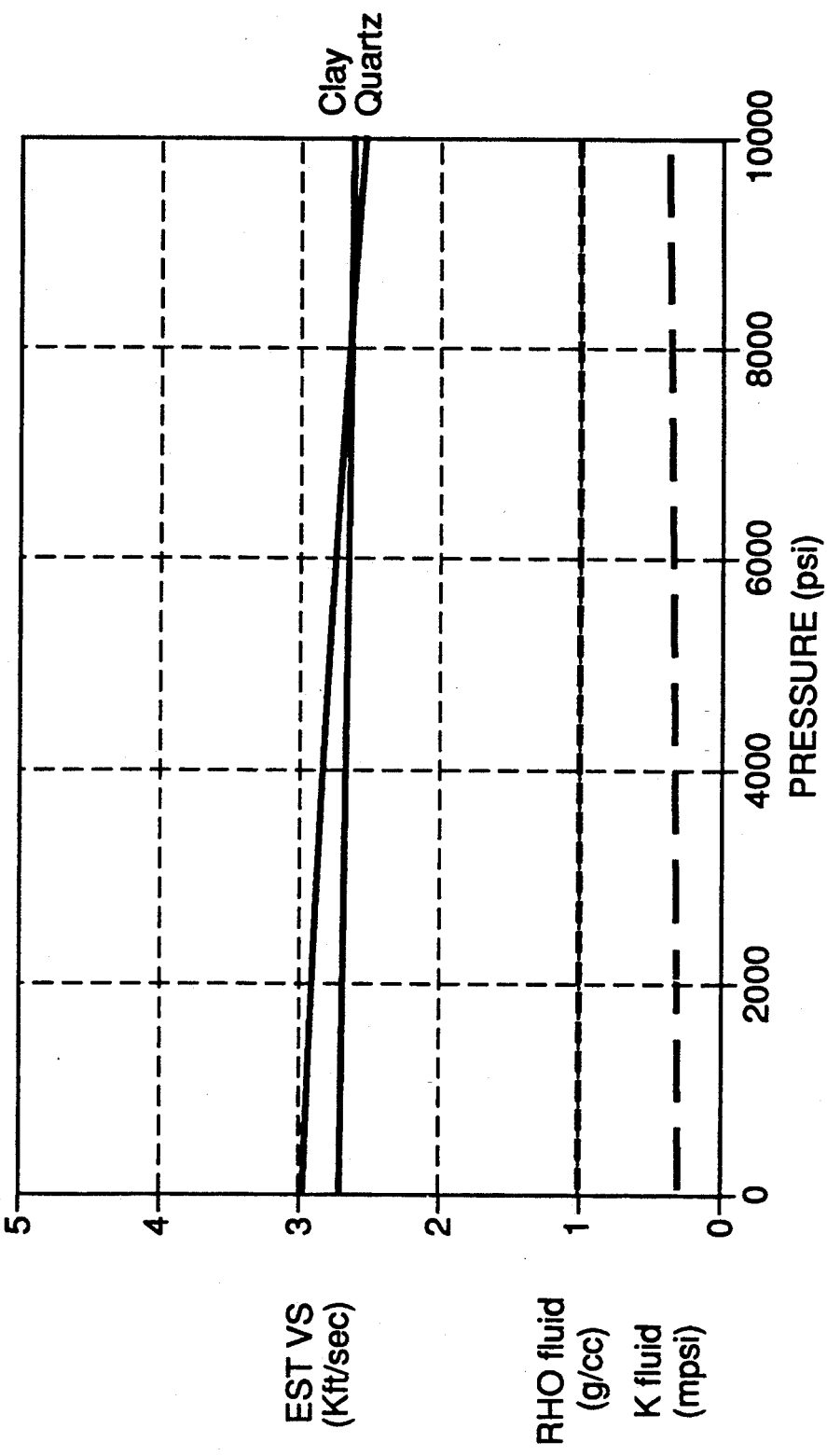

METHOD OF SHEAR WAVE VELOCITY ESTIMATION

This is a continuation of application Ser. No. 382,827, filed Jul. 19, 1989 now abandoned.

BACKGROUND OF THE INVENTION

1. Field of the invention

The present invention relates to methods of estimating shear wave velocity and, more particularly, to such methods and related systems for estimating the shear wave velocity of subterranean formation materials of the type where direct measurements of shear wave velocity are unobtainable by conventional methods.

2. Setting of the Invention

Through the years seismic explorationists employed in the search for subterranean hydrocarbons have utilized compressional wave velocities ($V_p$) to obtain information regarding subterranean features. Recently, shear wave velocities ($V_s$) have been utilized, along with such compressional wave velocities ($V_p$), to obtain a better understanding of the earth's subsurface features. One method of obtaining shear wave velocities is commonly referred to as sonic wave train logging, which utilizes sonic frequencies of about 5 to about 50 Kz. A monopole source and receiver array is placed within a fluid-filled wellbore to measure the formation's elastic properties via acoustic-elastic energy mode conversions at the wellbore fluid-formation interface. The sonic or acoustic monopole energy transmitting device generates acoustic compressional waves, which are converted at the borehole wall to both compressional and shear elastic waves critically refracted in the formation.

A problem with obtaining measurements of shear wave velocity often encountered in the field is that the formation to be logged has a shear wave velocity which is less than the acoustic velocity of the fluid within the wellbore. As is well known, in such instances no critically refracted formation shear waves are generated via the acoustic-elastic mode conversion at the wellbore fluid-formation interface; thus, no shear wave can be detected by the receivers. This problem is particularly common in offshore coastal regions, such as the United States Gulf Coast, where unconsolidated formation materials are prevalent.

Various solutions to this important problem have been proposed in the past. One approach has been to place multipole source-receiver acoustic arrays in a wellbore to directly impart and sense shearing motion at the wellbore wall without relying upon acoustic-elastic mode conversion. A problem with using such acoustic arrays is the requirement of azimuthal alignment and centering of the receivers and the transmitters within the wellbore. Another method has been proposed in U.S. Pat. No. 4,754,439, wherein the acoustic velocity of the wellbore fluid is altered in order to obtain shear wave velocity signals. Yet another approach relies upon other modes of borehole acoustic energy propagation, such as the Stoneley or the "tube wave." These waves are generated even when the formation shear velocity is less than the borehole fluid velocity and can be recorded and analyzed to infer formation shear velocity via known theoretical relationships. The analysis procedures used to "back out" the formation shear velocity from the Stoneley or "tube wave" are computationally intensive. One such method is disclosed in U.S. Pat. No. 4,633,449. Further, these computational methods to back out the shear velocity require exceptionally good data quality to yield stable numerical results.

Various research efforts have been directed to establishing alternative, less computationally intensive means for inferring shear wave velocity from other modes of borehole wave propagation, such as the compressional wave. It has been known that formation compressional wave velocity ($V_p$) and shear wave velocity ($V_s$) are functions of formation bulk modulus (K), shear modulus (G), and density ($\rho$) according to the equations:

$$V_p = \sqrt{\frac{K + (4/3)G}{\rho}} \quad (1a)$$

$$V_s = \sqrt{\frac{G}{\rho}} \quad (1b)$$

Knowing the formation material density ($\rho$), such as from a conventional formation density log, the shear modulus (G) and the shear wave velocity ($V_s$) can be calculated from the compressional wave velocity ($V_p$) (obtained from a conventional sonic log) if the corresponding value of formation bulk modulus (K) is known, such as from published relationships and other databases. Then the above equations can be rewritten as:

$$4/3 G = \rho \cdot V_p^2 - K \quad (2)$$

Hence, the estimation of the formation shear wave velocity ($V_s$) becomes a matter of determining the appropriate insitu value for the bulk modulus (K) of the formation material.

Biot-Gassmann theory (Gassmann, *Geoph.*, 16, 673, 1951) directs that formation elastic moduli can be expressed in terms of the corresponding dry rock frame moduli plus a correction term which explicitly accounts for the effect of formation pore fluids. The resulting expressions for the bulk modulus (K) and shear modulus (G) thus become:

$$K = K^* + \frac{\alpha^2}{\phi + (K_f/K_s)(\alpha - \phi)} \cdot K_f \quad (3a)$$

$$\alpha = 1 - \frac{K^*}{K_s} \quad (3b)$$

$$G = G^* \quad (3c)$$

Wherein the bulk and shear moduli of the porous rock frame work (i.e., the "frame"moduli) are $K^*$ and $G^*$ respectively, the bulk modulus of the formation pore fluid is $K_f$, the aggregate bulk modulus of the formation mineral grains is $K_s$, and formation porosity is $\phi$, an estimate of which can be obtained from a conventional density log.

Combining the Equations (3a) and (3b) above, with Equation (2) yields the expression:

$$\frac{4}{3}G = \rho \cdot V_p^2 - K^* - \frac{(1 - K^*/K_s)^2}{\phi + (K_f/K_s)\left(1 - \phi - \frac{K^*}{K_s}\right)} \cdot K_f \quad (4)$$

However, the frame bulk modulus ($K^*$) is still an implicit, unknown function of the formation mineralogy, porosity and rock microstructure, and the estimation of shear velocity requires some means of specifying this unknown dependence.

Previous attempts to provide appropriate values of the frame bulk modulus ($K^*$) have relied either upon empirical correlations developed from laboratory core measurements or various simplifying ad hoc assumptions. The empirical correlations can be of the type disclosed in U.S. Pat. Nos. 4,375,090; 4,393,486; 4,398,273; and 4,399,525. Simplified ad hoc assumptions used in the past include that of $K^*=G^*$ as disclosed in "Relationships Between Compressional-Wave and Shear-Wave Velocities in Elastic Silicate Rocks," Castagna et al., Geophysics (1985), 50:4, pp. 571–581.

A problem with utilizing the above methods is that laboratory core measurements representative of the subterranean formation may not be available and such ad hoc assumptions as above may be incorrect. Thus, there is a need for an alternative means of specifying dry rock bulk modulus and thereby estimating shear velocity.

SUMMARY OF THE INVENTION

The present invention has been developed to overcome the forgoing deficiencies and meet the above-described needs. Specifically, the present invention is a method and related system for obtaining an estimate of the shear wave velocity of a formation material. In the method, values are obtained of the compressional velocity and density of the formation material, such as from wellbore logs. Estimates are then obtained of the formation aggregate mineral grain density, formation pore fluid density, formation porosity, bulk modulus of the formation pore fluid, bulk modulus of the aggregate mineral grains, and shear modulus of the aggregate mineral grains. Thereafter, utilizing a theoretical relationship approximating the ratio of frame bulk modulus and frame shear modulus ($K^*/G^*$) to the ratio of bulk modulus of the aggregate mineral grains and shear modulus of the aggregate mineral grains ($K_s/G_s$), and utilizing the values and estimates obtained above, an estimate of the shear velocity of the formation material can be obtained.

By using the present invention and typical wellbore logs, as well as refined estimates of the formation aggregate mineral grains and pore fluid parameters, formation shear wave velocity can be reliably estimated without the need for obtaining formation core material and without the use of simplistic and perhaps erroneous ad hoc assumptions.

BRIEF DESCRIPTION OF THE DRAWINGS

FIGS. 4a, 4b and 4c are graphical representations showing the theoretical dependence of brine density and bulk modulus on temperature (FIG. 4a), pressure (FIG. 4b), and salinity (FIG. 4c) and the resulting estimated shear wave velocity values.

DETAILED DESCRIPTION OF THE PREFERRED EMBODIMENTS

The present invention is a method and related system of use for obtaining an estimate of shear wave velocities of formation material where a direct in-situ measurement of such shear wave velocities may not be readily obtainable, for example, due to the unconsolidated nature of the formation and lack of core material from which laboratory measurements would be obtained. In the method of the present invention, values are obtained of the compressional velocity ($V_p$) and density ($\rho$) of the formation material, and estimates are obtained of the formation aggregate mineral grain density ($\rho_s$), formation pore fluid density ($\rho_f$), bulk modulus of the pore fluid ($K_f$), bulk modulus of the aggregate mineral grains ($K_s$) and shear modulus of the aggregate mineral grains ($G_s$). From these values and estimates, and utilizing a theoretical relationship that approximately equates the ratio of frame bulk modulus ($K^*$) and frame shear modulus ($G^*$) to the ratio of bulk modulus of the aggregate mineral grains ($K_s$) and shear modulus of the aggregate mineral grains ($G_s$), an estimate of the shear velocity ($V_s$) of the formation material can easily and reliably be made.

In the method of the present invention, a wellbore is drilled into the earth to penetrate subterranean formations. Thereafter, various suites of wireline logs may be obtained; such logs can include density logs (from which formation material density ($\rho$) and porosity ($\phi$) can be determined), gamma ray logs (from which the percentage of clay/shale can be determined), and resistivity logs (from which brine saturation and brine salinity can be determined). Also, borehole sonic logs can be utilized to provide values for compressional wave velocities ($V_p$). Published relationships and databases can be used to provide quite accurate estimates of the formation material aggregate grain density ($\rho_s$), formation pore fluid density ($\rho_f$), formation porosity ($\phi$), bulk modulus of the pore fluid ($K_f$), bulk modulus of the aggregate mineral grains ($K_s$) and shear modulus of the aggregate mineral grains ($G_s$) by analysis of the wellbore logs to indicate the type of material encountered and the percentages thereof. Where one or more of the above data are not available, that data may be estimated independently, and the following procedures carried through with some consequent loss of confidence.

The inventors hereof have found that the above easily obtainable information can be used to further obtain an accurate estimation of shear wave velocity ($V_s$) from the known theoretical relationships represented in equations 1–4 and with the inclusion of the following newly described relationships.

Figure 1:
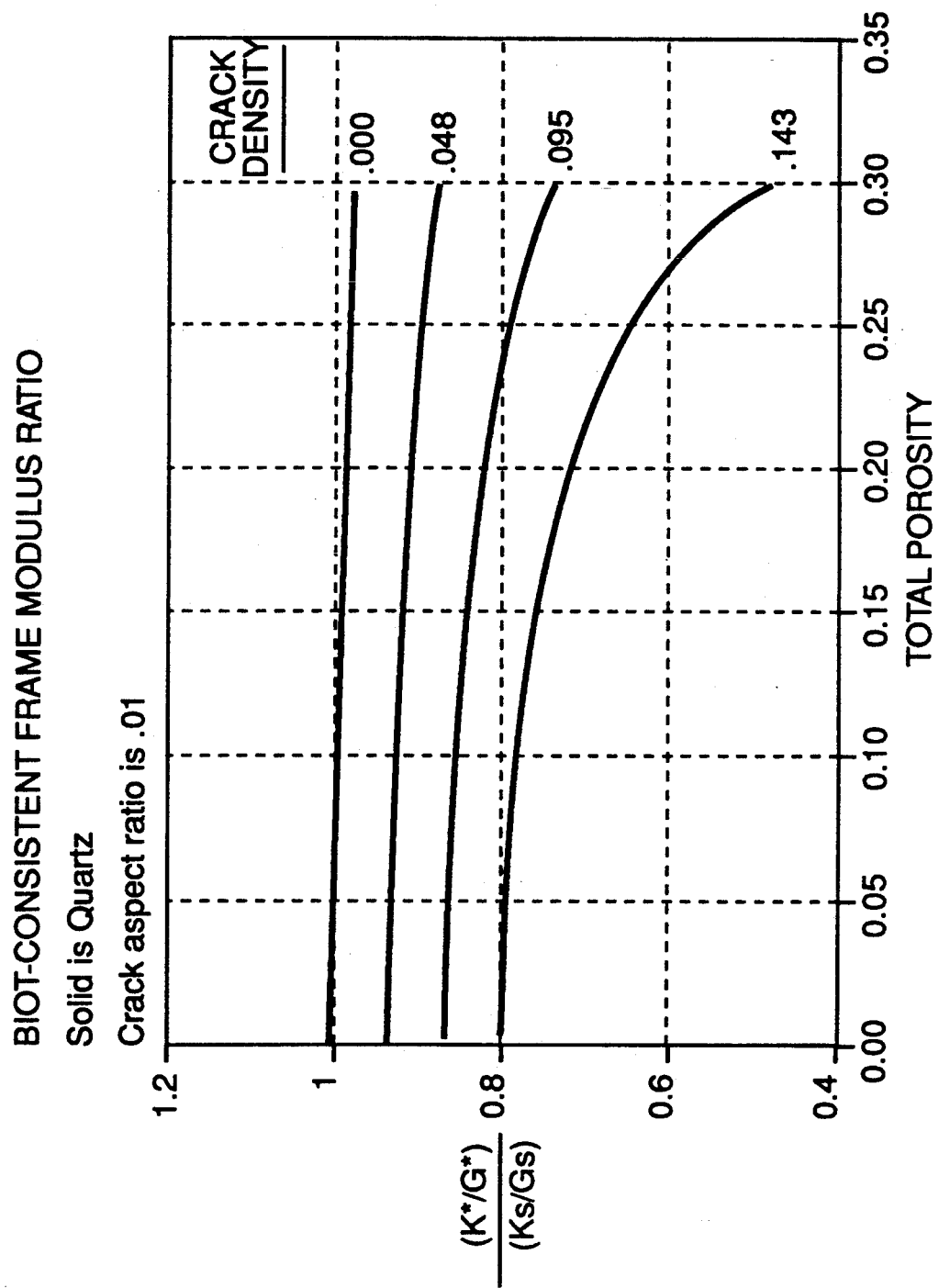
FIG. 1 is a graphical representation showing the theoretical dependence of rock elastic moduli ratios on rock porosity and a rock microstructure parameter, being crack density.

Examination of theoretical models which represent the dependence of porous rock elastic moduli on rock microstructure or pore shape and rock porosity, such as that described by one of the inventors hereof in "Biot-Consistent Elastic Moduli of Porous Rocks: Low Frequency Limit," Geophysics, 50:12, pp. 2797–2807 (1985), reveals a surprising feature shown in FIG. 1. In FIG. 1, the ratio of frame bulk modulus ($K^*$) to frame shear modulus ($G^*$) is seen to be relatively insensitive to porosity Moreover, for small formation crack densities, this ratio has the same value as that of the solid mineral grains. In the case of unconsolidated sediments, where typically shear wave velocities are not measured and must be estimated, the restriction to small crack densities is most appropriate and thus the following approximate relationship is highly accurate:

$$\frac{K^*}{G^*} \approx \frac{K_s}{G_s} \tag{5}$$

Utilizing Equation 5 and Equation 3c above, Equation 4 above can be rewritten as:

$$G \approx \frac{1}{4/3 + K_s/G_s} \cdot \tag{6}$$

$$\left[ \rho \cdot V_p^2 - \frac{(1 - G/G_s)^2}{\phi + (K_f/K_s)(1 - \phi - G/G_s)} \cdot K_f \right]$$

The solution of equation G for shear modulus (G) can be found numerically by iterative methods, as is well known to those skilled in the art, provided that an appropriate estimation of in-situ values for $\phi$, $K_f$, $K_s$ and $G_s$ can be obtained. As previously described, accurate values of $\phi$, $K_f$, $K_s$ and $G_s$ can be obtained by those skilled in the art from published sources and appropriate data. Thus, an estimate of formation material shear wave velocity ($V_s$) can be found utilizing the solution of equation 6 in Equation 1b.

Figure 2:
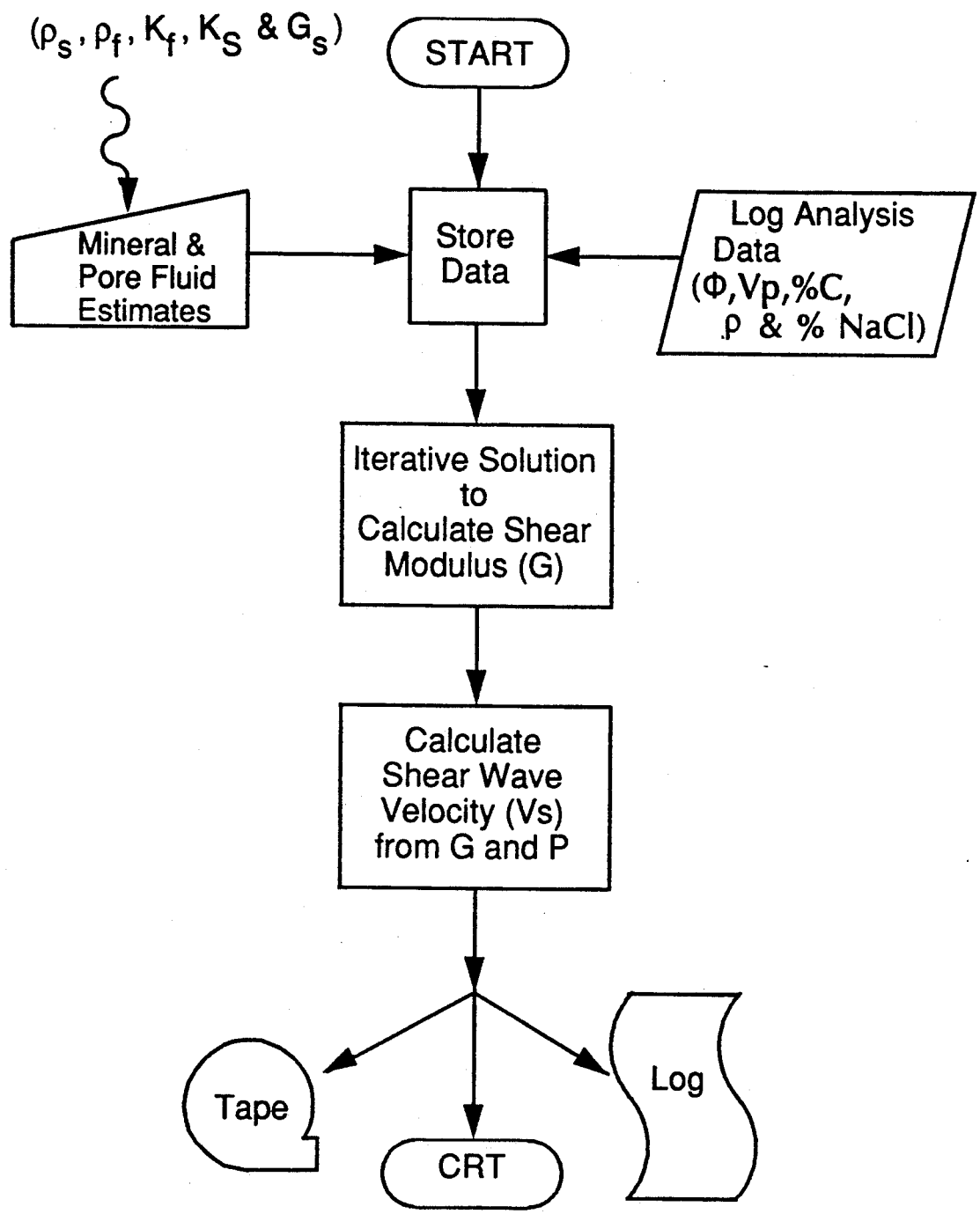
FIG. 2 is a flow chart illustrating one methodology of implementing the present invention.

As shown in FIG. 2, the estimation of the shear wave velocity ($V_s$) of desired formation material is accomplished by utilizing commercially available log analysis services, published mineral data, and a programmable digital computer. From the log analysis services, at each depth a value of the formation porosity ($\phi$), compressional wave velocity ($V_p$), brine concentration, density ($\rho$), and shale concentration can be inputted into a data storage medium, such as a Random Access Memory. From an analysis of the logs, an accurate estimate of the type and condition of the formation material can be obtained in order to provide the remaining needed variables regarding the formation mineral properties ($\rho_s$, $K_s$ and $G_s$) and the formation pore fluid properties ($\rho_f$ and $K_f$). These estimates can be inputted into a like data storage medium.

Thereafter, a sequence of data processing mechanisms/algorithms can be invoked to iteratively find the solution to the equations described above to yield a value for the shear modulus (G) from which, along with density ($\rho$), an estimate of the shear wave velocity ($V_s$) can be obtained.

Again, using known techniques all or portions of the above estimates, values and calculated velocities can be presented to the operator in data form, visually and/or on a depth correlated hardcopy "log." Further, any desired ratio or relationships of the values, estimates and calculated velocities can be displayed, as will be described herein below.

A detailed description of how the method of the present invention has been reduced to practice and tested will be provided below.

The elastic properties of most minerals are known, having been measured in various laboratories on single crystals, and the results tabulated in the literature, such as that shown in "Single Crystal Elastic Constants and Calculated Aggregate Properties: A Handbook," Second Edition, MIT Press, Cambridge., Mass., Simmons/-Wang (1971). Unfortunately, the properties of clay materials are usually not included. However, elastic moduli values for clay, and other common formation minerals, can also be determined from laboratory measurements on sedimentary rock samples, whose mineralogical compositions are also determined by direct measurement. Multiple regression analysis has, in the past, permitted statistical removal of porosity, pressure and saturation effects from the data, thereby establishing moduli values for the solid aggregate mineral portion of the samples, which in turn can be statistically related to their quantitative mineralogical compositions.

Of the various minerals considered, clay is the weakest and perhaps the most important in determining appropriate formation solid properties. The derived relationships according to the above technique for solid density $\rho_s$ and elastic moduli $G_s$, $K_s$ in terms of clay content (C) are:

$$\rho_s = 2.65(1 - 0.021C) \tag{7a}$$

$$G_s = 3.9(1 - 1.381C + 0.491C^2 - 0.010C^3) \tag{8b}$$

$$K_s = 5.56(1 - 0.841C + 0.185C^2 - 0.004C^3) \tag{8c}$$

Figure 3:
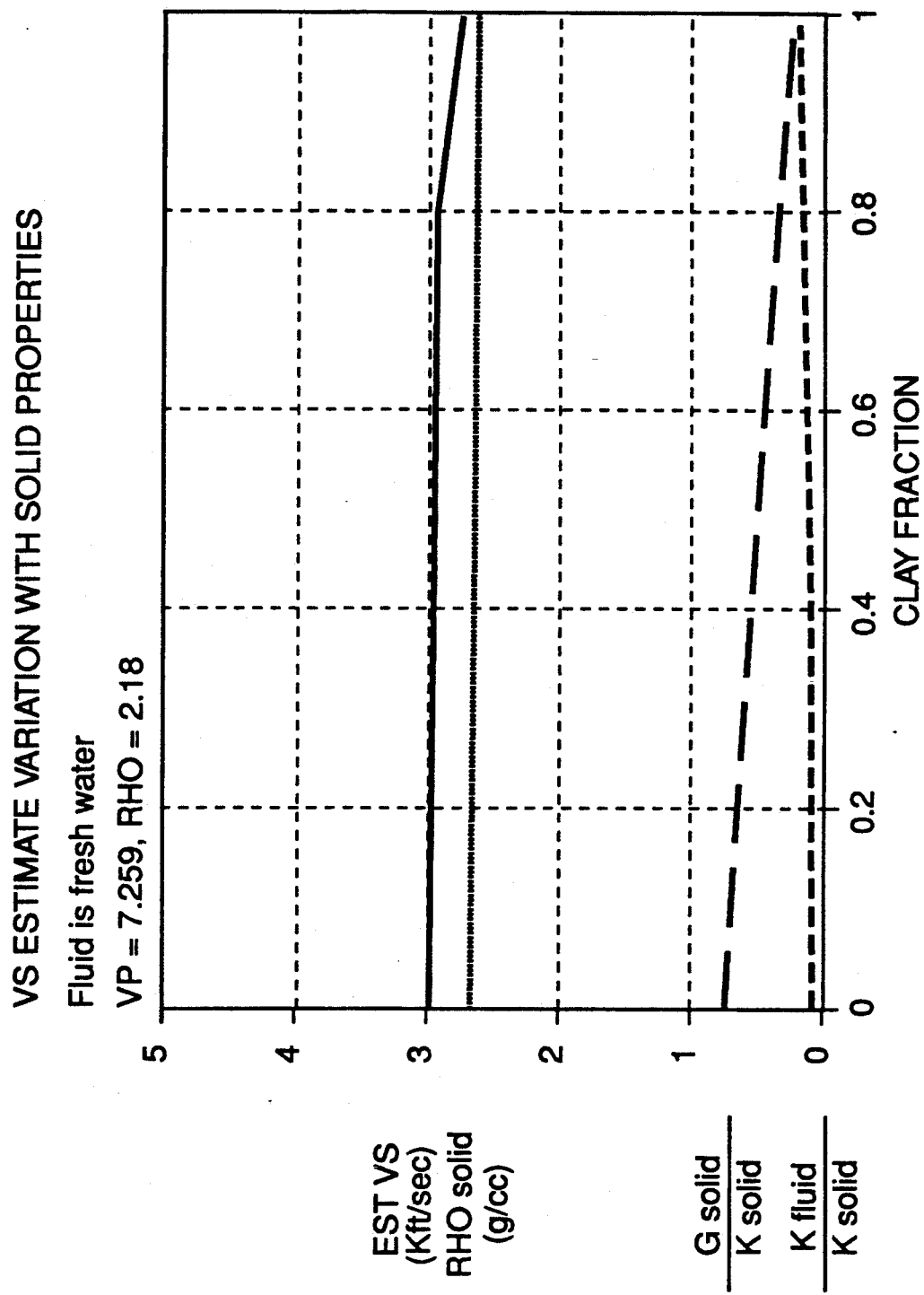
FIG. 3 is a graphical representation showing the theoretical dependence of solid properties and the estimated shear wave velocity value for water saturated formations on the formation volumetric clay fraction.

FIG. 3 illustrates this dependence of solid properties set forth above on the volumetric clay fraction C, and the resulting effect on the estimated shear wave velocity value for water saturated formations. The values for compressional wave velocity ($V_p$) and density ($\rho$) in FIG. 3 are appropriate for water-saturated unconsolidated elastic sediments. The actual clay fraction of an in-situ formation can easily be estimated from gamma ray natural radioactivity readings. Such methods are described in "Log Interpretation Principles/Applications," Schlumberger Educational Services, Houston, Tex. (1987). Then $\rho_s$, $G_s$ and $K_s$ may be estimated via equation (8), or similar relationships.

The formation pore fluid properties ($\rho_f$ and $K_f$), of course, depend upon the type of fluid present, i.e., gas, oil or brine. For these fluids, $\rho_f$ and $K_f$ are dependent to varying degrees on pressure and temperature. Focusing on the usual situation wherein the formation material is brine saturated, a thermodynamic equation of state for aqueous brine (NaCl) solutions may be used to determine formation brine density ($\rho_f$) and bulk modulus ($K_f$) at a pressure and temperature appropriate to a particular formation depth, if the salinity of the formation water is known. Salinity in turn is easily estimated from a formation resistivity log, again using standard well log analysis techniques. The thermodynamic equation of state for aqueous brine solutions can be found in "Pressure-Volume-Temperature Concentration Relation of Aqueous NaCl Solutions," Journal Chemical Engineering Data, 15:1, pp. 61–65, Rowe/Chou (1970).

Figure 4A:
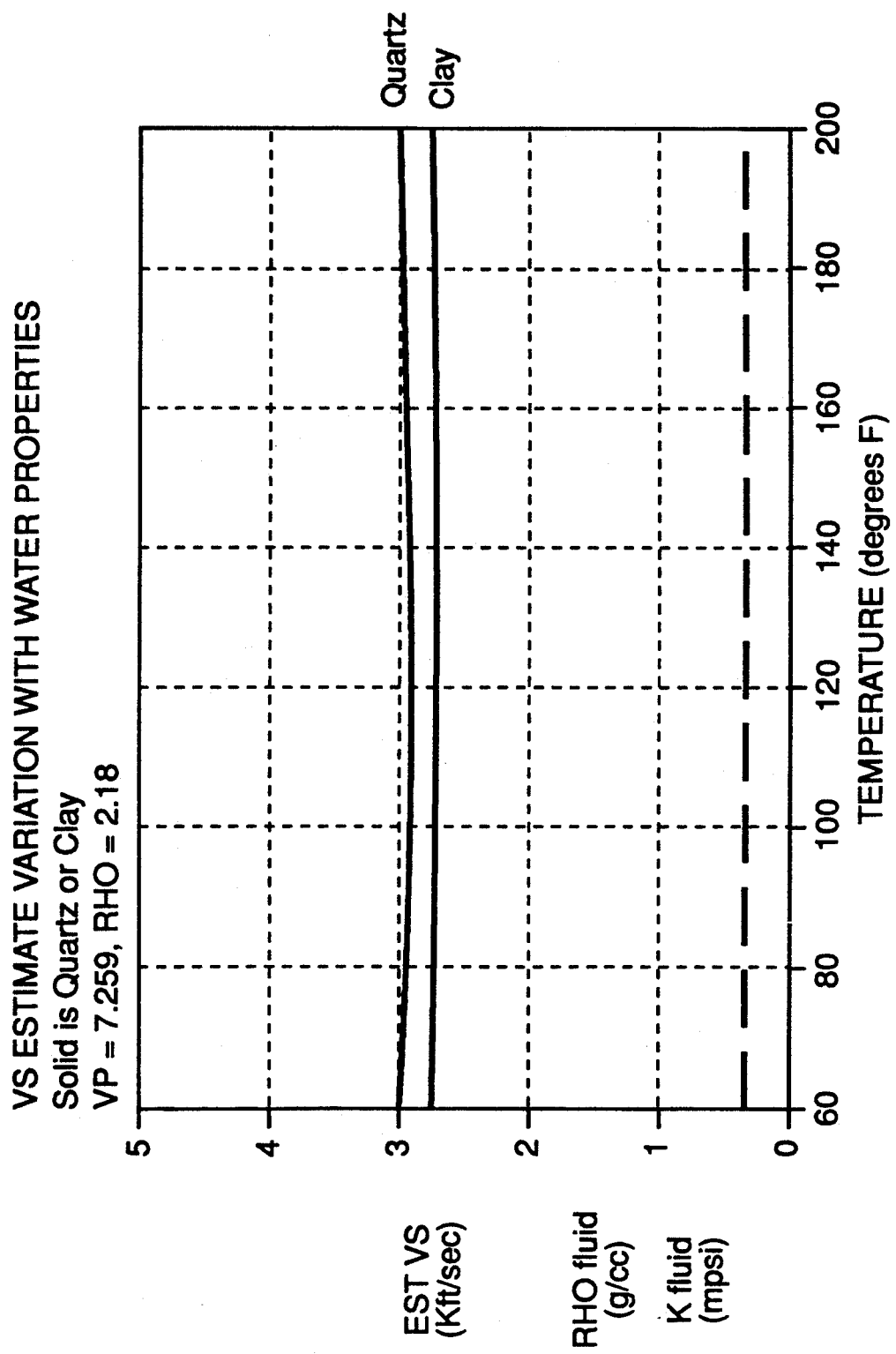
Figure 4C:
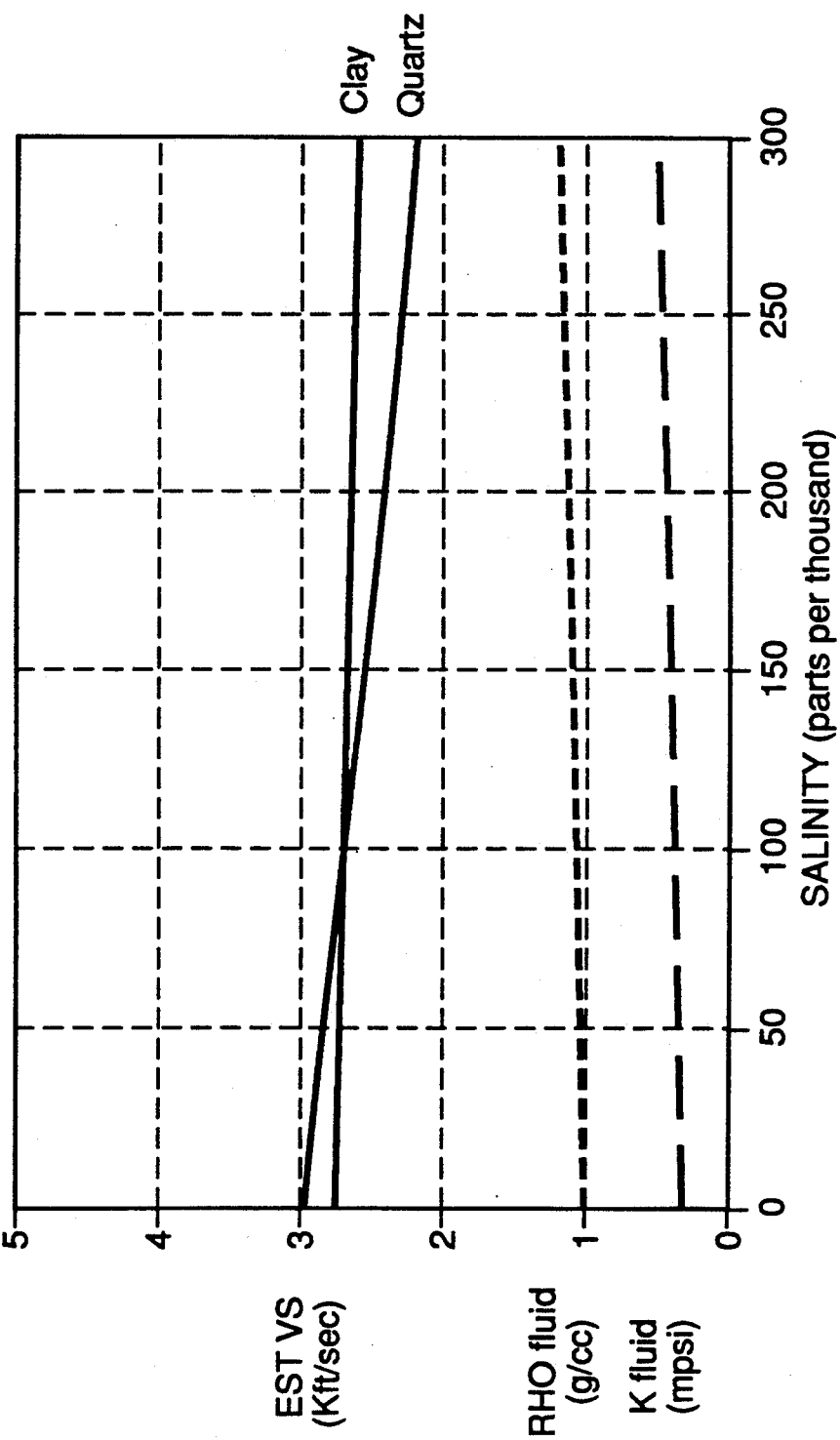

FIGS. 4a, 4b and 4c show the dependence of brine density and bulk modulus on temperature, pressure and salinity respectively and the resulting effect on the estimated shear wave velocity value. In FIGS. 4a, 4b and 4c, the solid matrix has been assumed to be either pure quartz or pure clay, and it is apparent that a variation of brine properties in-situ can produce errors in the estimated shear wave velocity value by as much as 25%, if not properly accounted for. This is particularly true of salinity, which is not at all constant in the subsurface and can change substantially from one formation to the next. This phenomenon was described in "Interstitial Water Composition in Geochemistry of Deep Gulf Coast Shales and Sandstones," American Association of Petroleum Geology's Bulletin, 57:2, pp. 321–337, Schmidt (1973).

Figure 5:
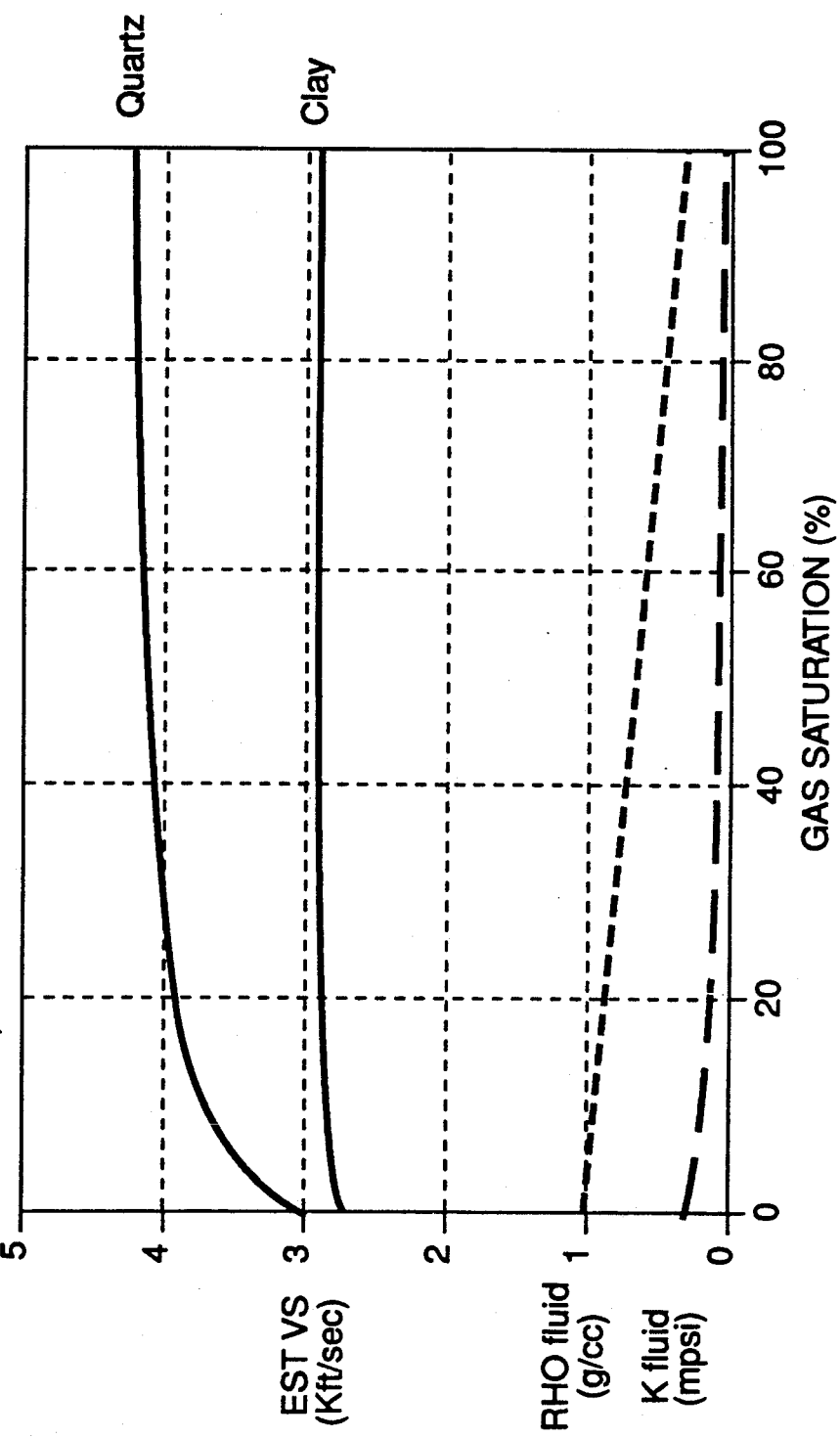
FIG. 5 is a graphical representation showing the theoretical dependence of composite fluid properties and the resulting shear wave velocity estimates on hydrocarbon saturation.

In the case of hydrocarbon-bearing formations, composite fluid properties (those being a volumetrically-weighted average of the appropriate hydrocarbon properties at depth and the corresponding brine properties) are used for $K_s$ and $\rho_f$. The additional parameter required here is the formation hydrocarbon saturation, which again is estimated from the resistivity log, by standard methods. FIG. 5 illustrates the dependence of such composite fluid properties, and the resulting shear wave velocity estimate, on hydrocarbon saturation, where the hydrocarbon component has been taken to be methane at a pressure and temperature equivalent to about 8000 ft depth of burial.

The formation porosity ($\phi$) is commonly estimated from formation density logs by the relationship:

$$\phi = \frac{\rho_s - \rho}{\rho_s - \rho_f} \quad (8)$$

The above-described procedure for shear wave velocity estimation was tested using wireline logging data from an offshore well in the Gulf Coast area of Texas, where shear wave velocity data has been independently measured using an experimental multipole shear wave measuring tool. The sedimentary formations analyzed consisted of unconsolidated, brine-saturated shale and gas sands being moderately overpressured (15.2 lbs/gallon mud weight, equivalent to a pore pressure gradient of 0.79 lbs/sq in./ft) over a depth interval from about 7700 ft to about 8440 ft below sea level. The average measured shear velocity of the sediments was 3024 ft per second, indicating that conventional sonic wave train logs would be unable to determine $V_s$ at all in this interval.

Figure 6:
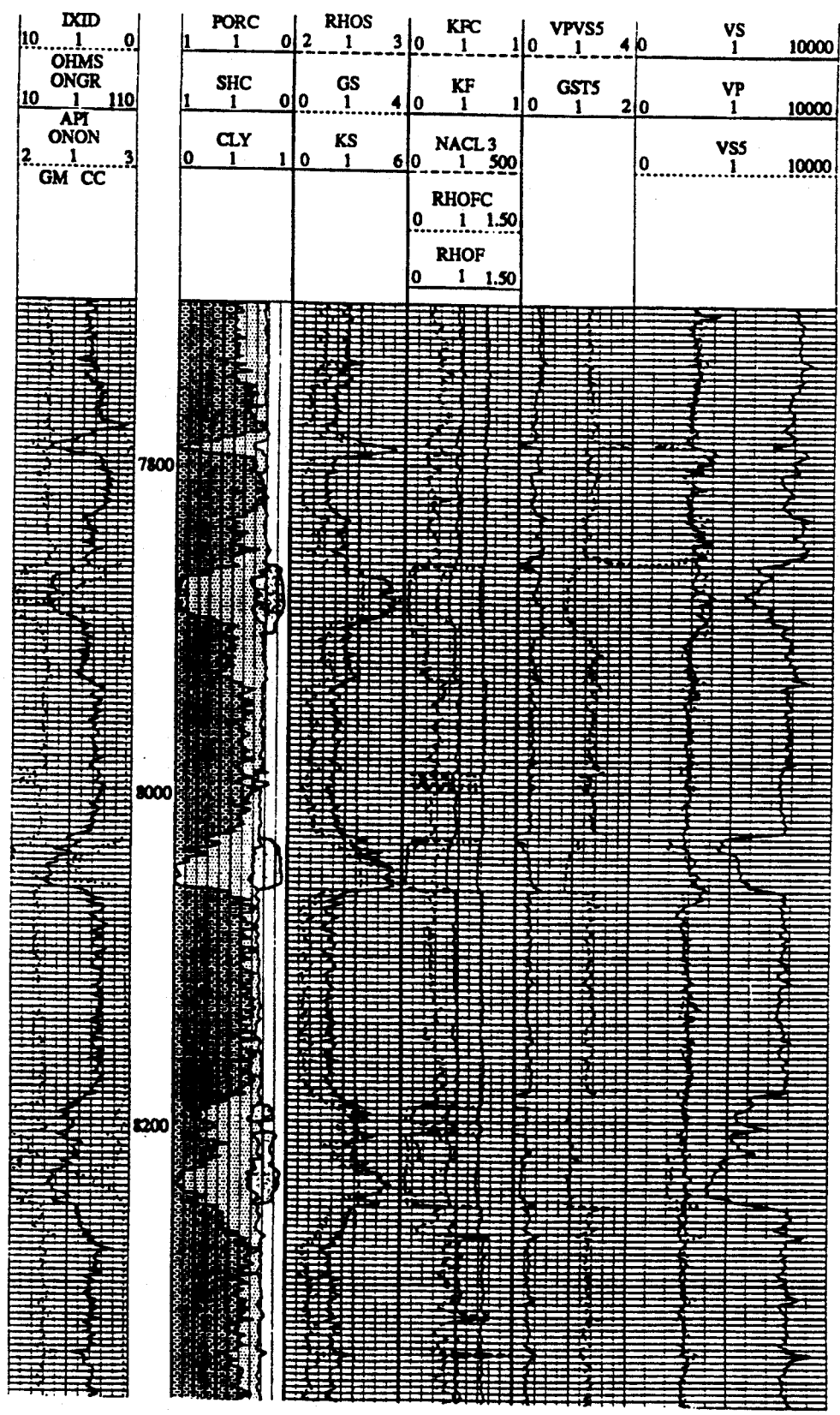
FIG. 6 is a well log showing measured formation shear wave velocity $V_s$ (OBS) along with the corresponding estimated values of shear wave velocity $V_s$ (EST).

FIG. 6 shows the input well log data being gamma ray (DNGR), deep induction resistivity (IXID), formation density (DNDN), sonic compressional velocity (VP); the log analysis results being formation clay content (CLY), porosity (PORC), hydrocarbon saturation (SHC), and brine salinity (NaCl3); the calculated formation aggregate mineral grain properties being density (RHOS), bulk modulus (KS), shear modulus (GS); the calculated formation fluid properties being brine bulk modulus (KF), composite fluid bulk modulus (KFC), brine density (RHOF), and composite fluid density (RHOFC); and finally, the estimated values being formation shear modulus (GEST), shear wave velocity (VSEST), and compressional-to-shear velocity ratio (VPVSEST). Also shown for comparison purposes is the measured formation shear wave velocity (VSOBS). Generally, one can see (as shown in FIG. 6), that there is extremely good agreement between the measured value of formation shear wave velocity and the estimated value of formation shear wave velocity in the sands and shales, thus verifying the accuracy of the method of the present invention.

Figure 7:
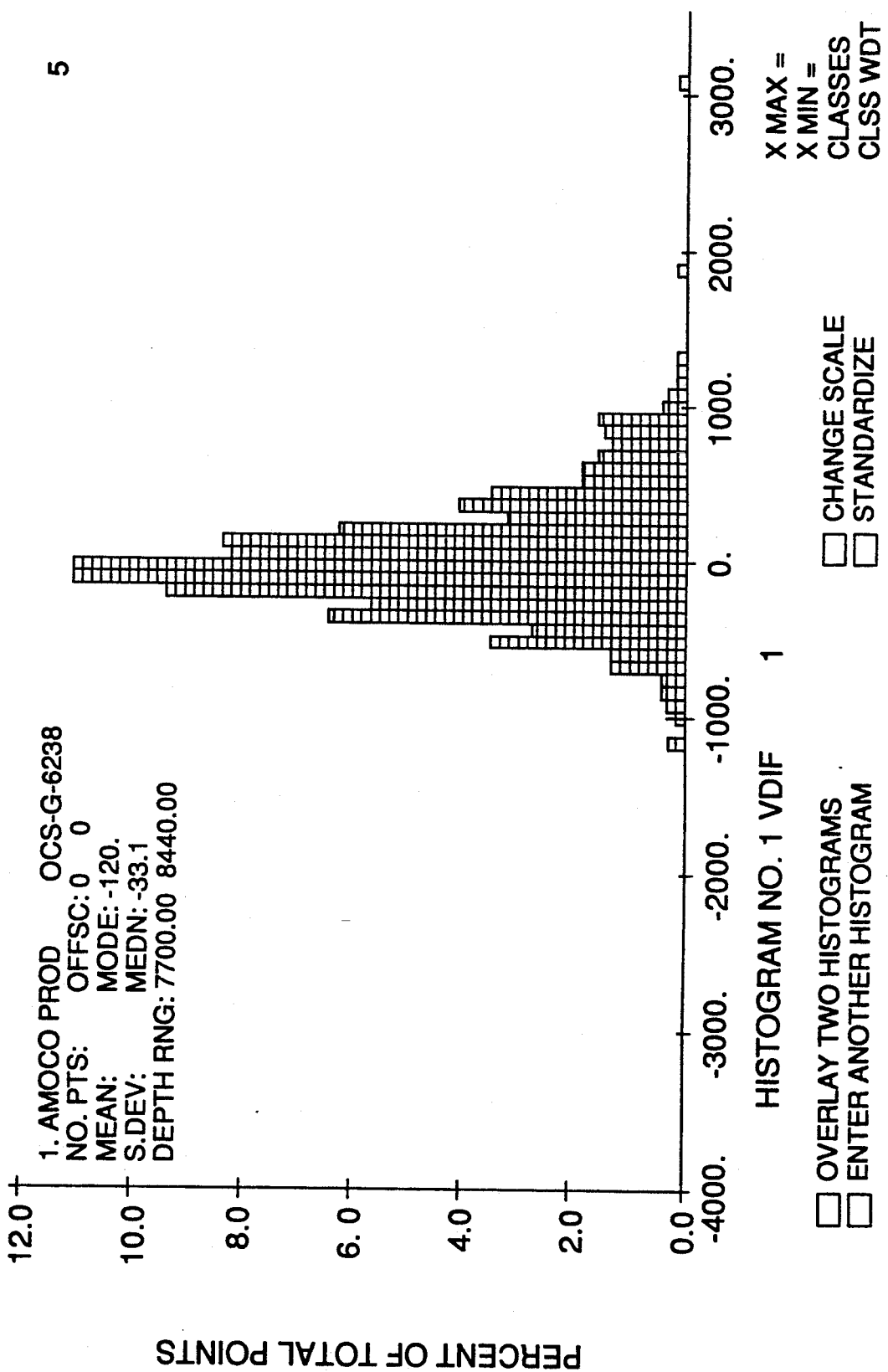
FIG. 7 is a histogram showing the difference between actual measured formation shear wave velocities and shear wave velocities estimated utilizing the method of the present invention.

FIG. 7 is provided to show a quantitative analysis of the estimation errors in the form of a histogram of the difference between actual and estimated shear wave velocities. Over the depth interval analyzed, the mean error is 18.2 ft/sec, the standard deviation of the error is 402 ft/sec or about 13%. This level of estimation error is reasonable and solely adequate for the purposes being contemplated herein.

Figure 8:
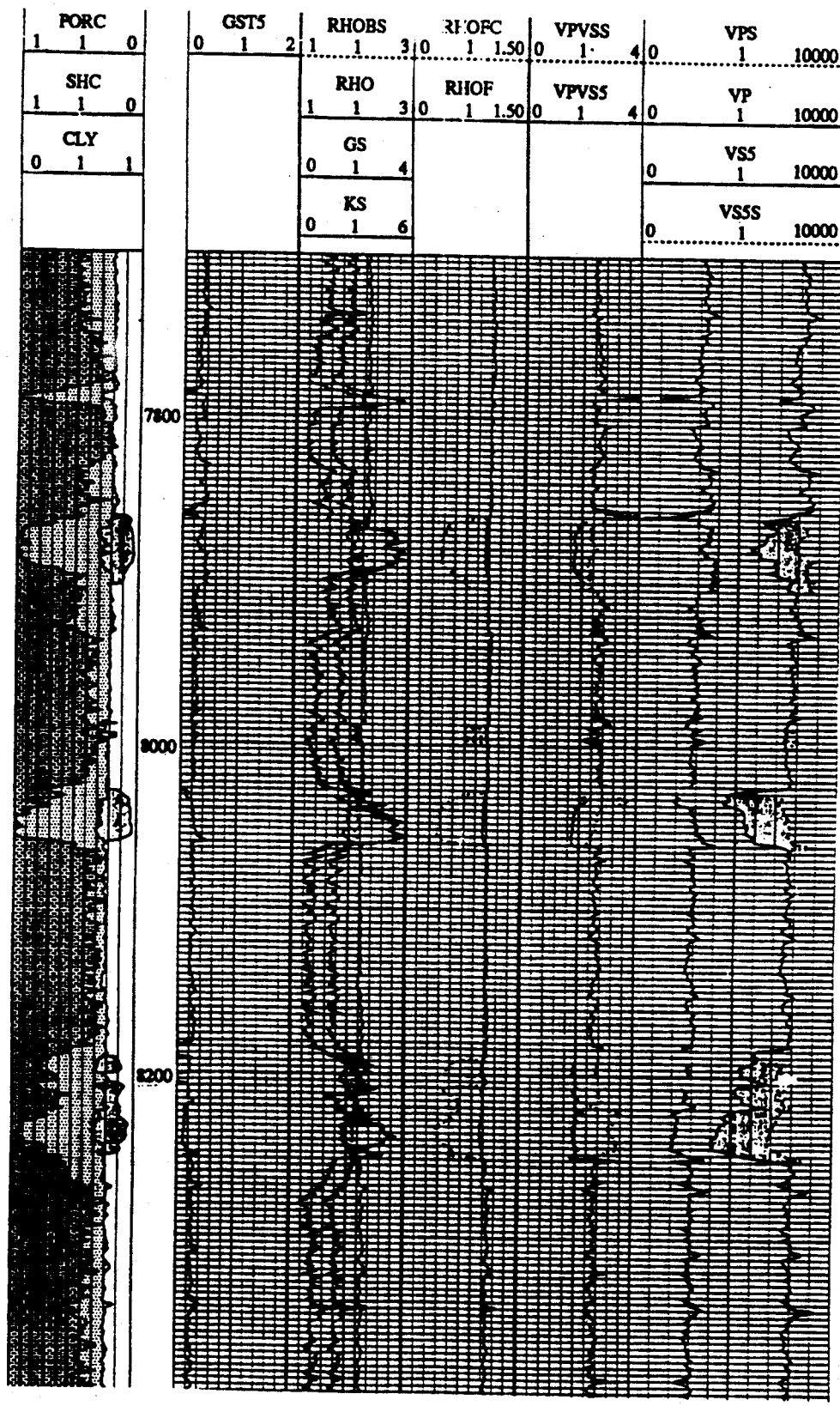
FIG. 8 is a well log showing the effect of hydrocarbon saturation on both formation compressional wave and shear wave velocities.

Noting that having successfully estimated shear wave velocity in hydrocarbon-bearing formations, one can by the same methodology predict appropriate values for both compressional wave velocity and shear wave velocity under the assumption that these formations were completely brine saturated. FIG. 8 is provided to show such a prediction in the example well (RHOSAT, VPSAT, VSESTSAT, VPVSESTSAT, respectively being the predicted brine saturated formation density, compressional velocity, shear velocity and velocity-ratio values), and to illustrate the effect of hydrocarbon on brine saturation on the in-situ formation velocities. This effect (of brine saturation) causes formation compressional wave velocity to increase, and formation shear wave velocity to decrease marginally. Proper accounting for this effect is essential in any modeling and interpretation of seismic "bright spots," and seismic compressional-wave-range-dependent amplitude variations as direct hydrocarbon indicators. Thus, the present invention can be utilized in conjunction with, or in place of, the normal "bright spot" detection methods such as the type disclosed in the Thompson et al. patents supra.

Wherein the present invention has been described in particular relation to the drawings attached hereto, it should be understood that other and further modifications, apart from those shown or suggested herein, may be made within the scope and spirit of the present invention.

What is claimed:

1. A method for producing a log representative of shear wave velocities of formation materials along the length of a wellbore, comprising the steps of:
    (a) obtaining a first signal in the form of a log representative of density ($\rho$) of formation materials along the length of a wellbore;
    (b) obtaining a second signal in the form of a log representative of compressional wave velocity ($V_p$) of formation materials along the length of the wellbore;
    (c) defining a relationship between frame moduli and aggregate mineral moduli for the formation materials along the length of the wellbore; and
    (d) transforming the signals of density ($\rho$) and velocity ($V_p$) employing the relationship of (c) into an estimate of shear wave modulus (G) and producing a signal in the form of a log representation of shear wave velocity of the formation materials along the length of the wellbore.

2. The method of claim 1, wherein the frame moduli include frame bulk modulus (K*) and frame shear modulus (G*).

3. The method of claim 2, wherein the aggregate mineral moduli include aggregate mineral shear modulus ($G_s$) and aggregate mineral bulk modulus ($K_s$).

4. The method of claim 3, wherein the relationship between frame moduli and aggregate mineral moduli is defined according to:

$$\frac{K^*}{G^*} \simeq \frac{K_s}{G_s}.$$

5. The method of claim 1, wherein the estimate of shear wave modulus (G) is iteratively determined from estimates of formation porosity ($\phi$), formation density ($\rho$), aggregate mineral shear modulus ($G_s$), aggregate mineral bulk modulus ($K_s$), formation compressional wave velocity ($V_p$) and pore fluid bulk modulus ($K_1$).

6. The method of claim 5, wherein estimates of the formation porosity ($\phi$) can be obtained according to $$\phi = \frac{\rho_s - \rho}{\rho_s - \rho_f}$$

where $\rho_f$ = density of formation pore fluid
$\rho_s$ = density of formation solids
$\rho$ = formation density from well log 7. The method of claim 6, wherein estimates of formation solids density ($\rho_s$) are obtained according to:

$$\rho_s = 2.65(1 - 0.021C)$$

where C = clay content of formation materials.

8. The method of claim 5, wherein the measure of aggregate mineral shear modulus ($G_s$) is obtained according to:

$$G_s = 3.9(1 - 1.381C + 0.491C^2 - 0.010C^3)$$

where C—clay content of formation materials.

9. The method of claim 5, wherein the measure of aggregate mineral bulk modulus ($K_s$) is obtained according to $$K_s = 5.56(1 - 0.841C + 0.185C^2 - 0.004C^3)$$

where C = clay content of formation materials.

10. The method of claim 5, further including iternatively determining the shear wave modulus (G) according to:

$$G \simeq \frac{1}{\frac{4}{3} + \frac{K_s}{G_s}} \cdot \left[ \rho \cdot V_p^2 - \frac{(1 - G/G_s)^2}{\phi + (K_f/K_s)(1 - \phi - G/G_s)} \cdot K_f \right]$$

11. The method of claim 1, further including obtaining a log of shear wave ($V_s$) velocity according to:

$$V_s = (G/\rho)^{1/8}.$$

12. A system for producing logs representative of shear wave velocity for formation material along the length of a wellbore, comprising:
(a) input means for receiving and storing signals representative of compressional wave velocity and density obtained from logs of formation materials along the length of a wellbore;
(b) input means for receiving and storing estimates of aggregate mineral grain density, formation pore fluid density, pore fluid bulk modulus, aggregate mineral grain bulk modulus, and aggregate mineral grain shear modulus;
(c) means for retrieving the measures of (a) and estimates of (b) and for developing a measure of shear wave modulus for the formation materials along the length of the wellbore employing a defined relationship between frame moduli and aggregate mineral moduli of the formation materials; and
(d) output means for producing a signal in the form of a log representative of shear wave velocity of the formation material along the length of the wellbore from the shear wave modulus.

13. The system of claim 12, wherein the relationship between frame moduli and aggregate mineral moduli is defined according to:

$$\frac{K^*}{G^*} \simeq \frac{K_s}{G_s}.$$

where $K^*$ and $G^*$ are frame bulk and shear moduli, respectfully; and
$K_s$ and $G_s$ are aggregate mineral bulk and shear moduli, respectively.

* * * * *

UNITED STATES PATENT AND TRADEMARK OFFICE
CERTIFICATE OF CORRECTION

PATENT NO. : 5,265,016
DATED : November 23, 1993
INVENTOR(S) : Kenneth E. Hanson, et. al.

It is certified that error appears in the above-indentified patent and that said Letters Patent is hereby corrected as shown below:

| Col. | Line | |
|---|---|---|
| 9 | 45 | "further including iternatively" should read --further including iteratively-- |
| 10 | 13 | "$V_s=(G/\rho)^{178}$" should read --$V_s=(G/\rho)^{1/2}$-- |

Signed and Sealed this

Seventh Day of June, 1994

Attest:

BRUCE LEHMAN

Attesting Officer     Commissioner of Patents and Trademarks